United States Patent
Mayo et al.

(10) Patent No.: US 9,169,023 B2
(45) Date of Patent: Oct. 27, 2015

(54) CABIN SUPPLY BRACKET

(71) Applicant: Hamilton Sundstrand Corporation, Windsor Locks, CT (US)

(72) Inventors: Luke J. Mayo, Coventry, CT (US); John Perella, Monson, MA (US); Mark Vignali, Northfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 212 days.

(21) Appl. No.: 13/915,907

(22) Filed: Jun. 12, 2013

(65) Prior Publication Data
US 2014/0367543 A1    Dec. 18, 2014

(51) Int. Cl.
*A47F 5/00* (2006.01)
*B64D 13/00* (2006.01)

(52) U.S. Cl.
CPC ........... *B64D 13/00* (2013.01); *Y10T 29/49826* (2015.01)

(58) Field of Classification Search
CPC .... B60H 1/00535; B64D 13/02; B64D 13/08; B64D 2013/0625; B64D 13/00; F16M 13/00; F16M 13/02; Y10T 29/49826
See application file for complete search history.

(56) References Cited

U.S. PATENT DOCUMENTS

| 5,108,048 A * | 4/1992 | Chang | 244/118.1 |
| 6,270,051 B1 * | 8/2001 | Power | 248/638 |
| 7,637,521 B2 * | 12/2009 | Grant | 280/279 |
| 2013/0344790 A1 * | 12/2013 | Army et al. | 454/152 |

\* cited by examiner

*Primary Examiner* — Brian D Mattei
(74) *Attorney, Agent, or Firm* — Cantor Colburn LLP

(57) ABSTRACT

A cabin supply bracket for a cabin supply duct assembly is provided. The cabin supply bracket includes a base plate with a first, second, and third mounting hole distributed in a substantially triangular arrangement. The first mounting hole has a centerline defined therethrough. A coupling socket extends from the base plate. The coupling socket includes a first and second tie rod coupling support having a tie rod coupling hole formed therethrough and a first and second outer edge. The first outer edge is proximate the second mounting hole, and the second outer edge is proximate the third mounting hole. The coupling socket has a socket width defined between a first socket edge proximate the first outer edge and a second socket edge proximate the second outer edge. A ratio of the socket width to a thickness of the base plate is between 6.31 and 7.84.

17 Claims, 7 Drawing Sheets

CABIN SUPPLY BRACKET

BACKGROUND OF THE INVENTION

The subject matter disclosed herein relates to aircraft environmental control. More specifically, the subject disclosure relates to a cabin supply bracket of a cabin supply duct assembly for an aircraft environmental control system.

Environmental control systems (ECSs) are utilized on various types of aircraft for several purposes, such as in cooling systems for the aircraft. For example, components of an ECS may be utilized to remove heat from various aircraft lubrication and electrical systems and/or used to condition aircraft cabin air. A cabin air conditioning and temperature control system (CACTCS) is an example of an aircraft ECS that includes air cycle packs supplied with pressurized outside (fresh) air from electric motor-driven cabin air compressors (CACs) which condition fresh air for cabin heating and cooling. The CACTCS provides flow control for modulation of cooling pack air flow, recirculation fans to circulate cabin air, and associated valves and sensors used for system control.

The CACTCS may also include a trim air system to provide individual cabin zone temperature control. This includes trim temperature control valves, trim duct heaters and associated sensors. As one example, a CACTCS may provide control of six baseline passenger zones and a flight deck zone. Additional zones, such as a forward cargo zone, a crew zone and/or an attendant zone may be controlled by other ECSs. Recirculation fans may also be provided for additional air flow to the passenger cabin and to ensure that flow at an air distribution nozzle remains constant.

Various elements of aircraft ECSs can experience harsh environments including a wide range of temperatures, pressures, and vibrations. Elements of aircraft ECSs must also fit within a compact space and minimize weight while providing adequate strength to handle typical and peak stresses over the anticipated life of the elements. Ductwork supporting various flow paths must be held in a stable position to reduce the risk of leakage and efficiency loss.

BRIEF DESCRIPTION OF THE INVENTION

According to one aspect, a cabin supply bracket for a cabin supply duct assembly is provided. The cabin supply bracket includes a base plate with a first, second, and third mounting hole distributed in a substantially triangular arrangement. The first mounting hole has a centerline defined therethrough. A coupling socket extends from the base plate. The coupling socket includes a first and second tie rod coupling support having a tie rod coupling hole formed therethrough and a first and second outer edge. The first outer edge is proximate the second mounting hole, and the second outer edge is proximate the third mounting hole. The coupling socket has a socket width defined between a first socket edge proximate the first outer edge and a second socket edge proximate the second outer edge. A ratio of the socket width to a thickness of the base plate is between 6.31 and 7.84.

According to another aspect, a cabin supply assembly includes a tie rod coupled to a cabin supply duct and a cabin supply bracket. The cabin supply bracket includes a base plate with a first, second, and third mounting hole distributed in a substantially triangular arrangement. The first mounting hole has a centerline defined therethrough. A coupling socket extends from the base plate and is configured to receive the tie rod. The coupling socket includes a first and second tie rod coupling support having a tie rod coupling hole formed therethrough and a first and second outer edge. The first outer edge is proximate the second mounting hole, and the second outer edge is proximate the third mounting hole. The coupling socket has a socket width defined between a first socket edge proximate the first outer edge and a second socket edge proximate the second outer edge. A ratio of the socket width to a thickness of the base plate is between 6.31 and 7.84.

According to a further aspect, a method of installing a cabin supply bracket in a cabin air conditioning and temperature control system includes coupling a tie rod to a cabin supply duct. A cabin supply bracket is coupled to a mount bracket. The tie rod is coupled to the cabin supply bracket. The cabin supply bracket includes a base plate with a first, second, and third mounting hole distributed in a substantially triangular arrangement. The first mounting hole has a centerline defined therethrough. A coupling socket extends from the base plate and is configured to receive the tie rod. The coupling socket includes a first and second tie rod coupling support having a tie rod coupling hole formed therethrough and a first and second outer edge. The first outer edge is proximate the second mounting hole, and the second outer edge is proximate the third mounting hole. The coupling socket has a socket width defined between a first socket edge proximate the first outer edge and a second socket edge proximate the second outer edge. A ratio of the socket width to a thickness of the base plate is between 6.31 and 7.84.

DETAILED DESCRIPTION OF THE INVENTION

Figure 1:
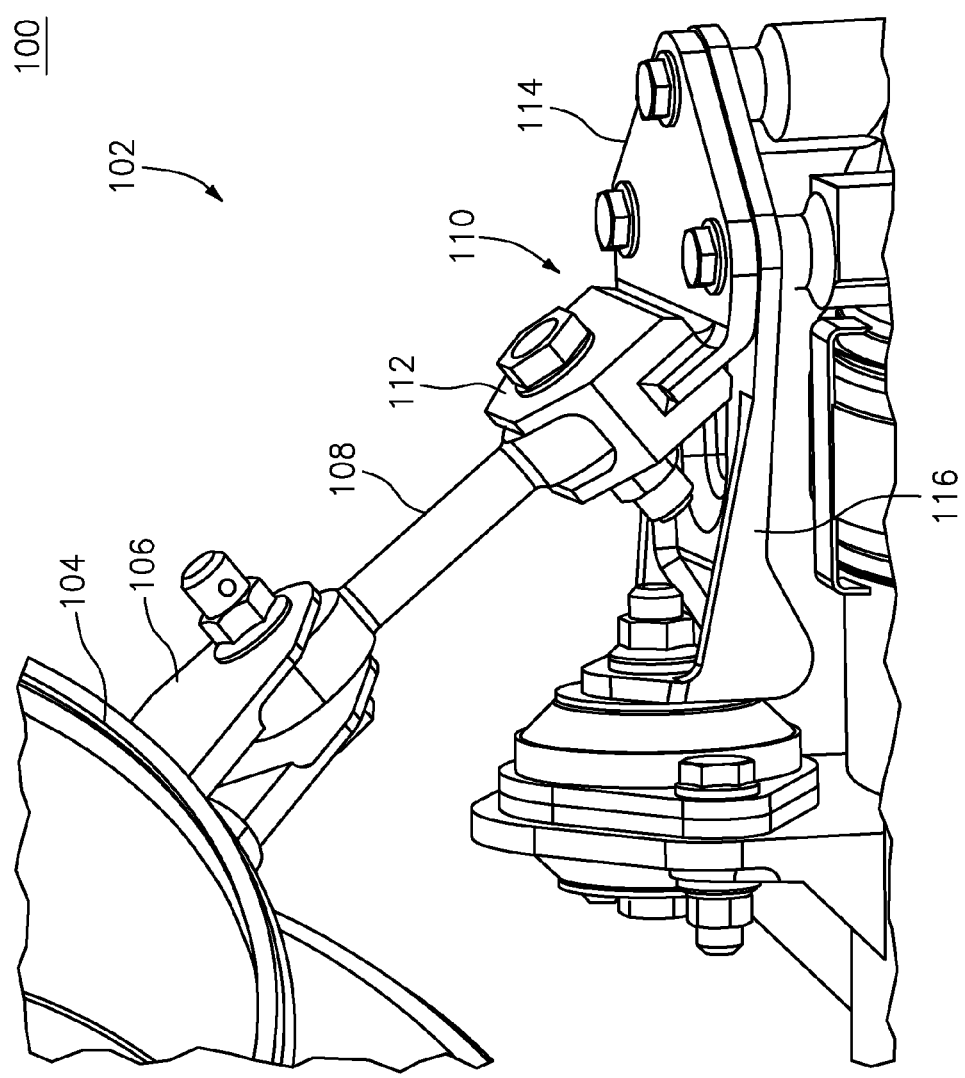
FIG. 1 is a partial perspective view of a cabin supply duct assembly including a cabin supply bracket.

Shown in FIG. 1 is a partial perspective view of a cabin supply duct assembly 102 that may be part of a cabin air conditioning and temperature control system (CACTCS) 100. The cabin supply duct assembly 102 includes a cabin supply duct 104 with a coupling junction 106. A tie rod 108 is coupled to the coupling junction 106 and a coupling socket 112 of a cabin supply bracket 110. A base plate 114 of the cabin supply bracket 110 is coupled to a mount bracket 116 to establish a support structure for the cabin supply duct 104 of the cabin supply duct assembly 102.

Figure 2:
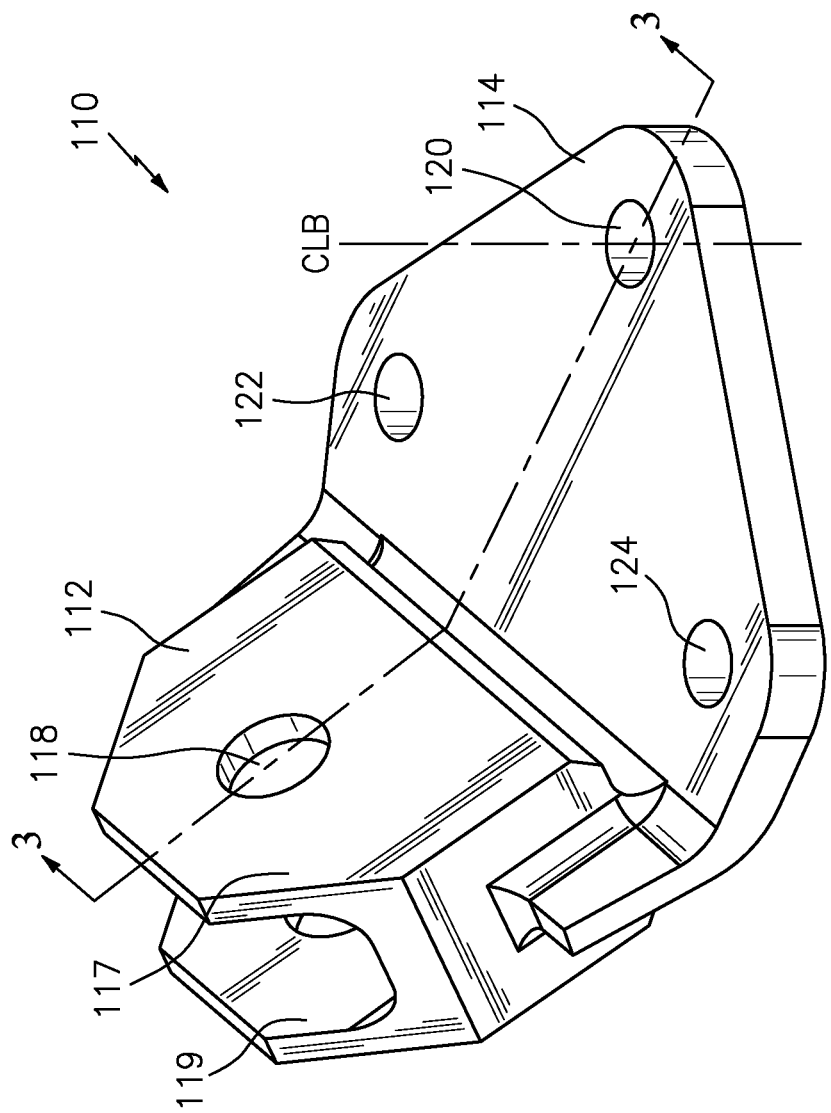
FIG. 2 is a perspective view of the cabin supply bracket of FIG. 1.

FIG. 2 is a perspective view of the cabin supply bracket 110 of FIG. 1. As can be seen in FIG. 2, the coupling socket 112 extends from the base plate 114 of the cabin supply bracket 110 and includes a tie rod coupling hole 118 formed in a first and second tie rod coupling support 117 and 119. The base plate 114 includes a first, second, and third mounting hole 120, 122, and 124 respectively distributed in a substantially triangular arrangement. The base plate 114 is substantially triangular in shape with the first mounting hole 120 located at a distal position relative to the coupling socket 112. A centerline B (CLB) is defined as a centerline through the first mounting hole 120.

Figure 3:
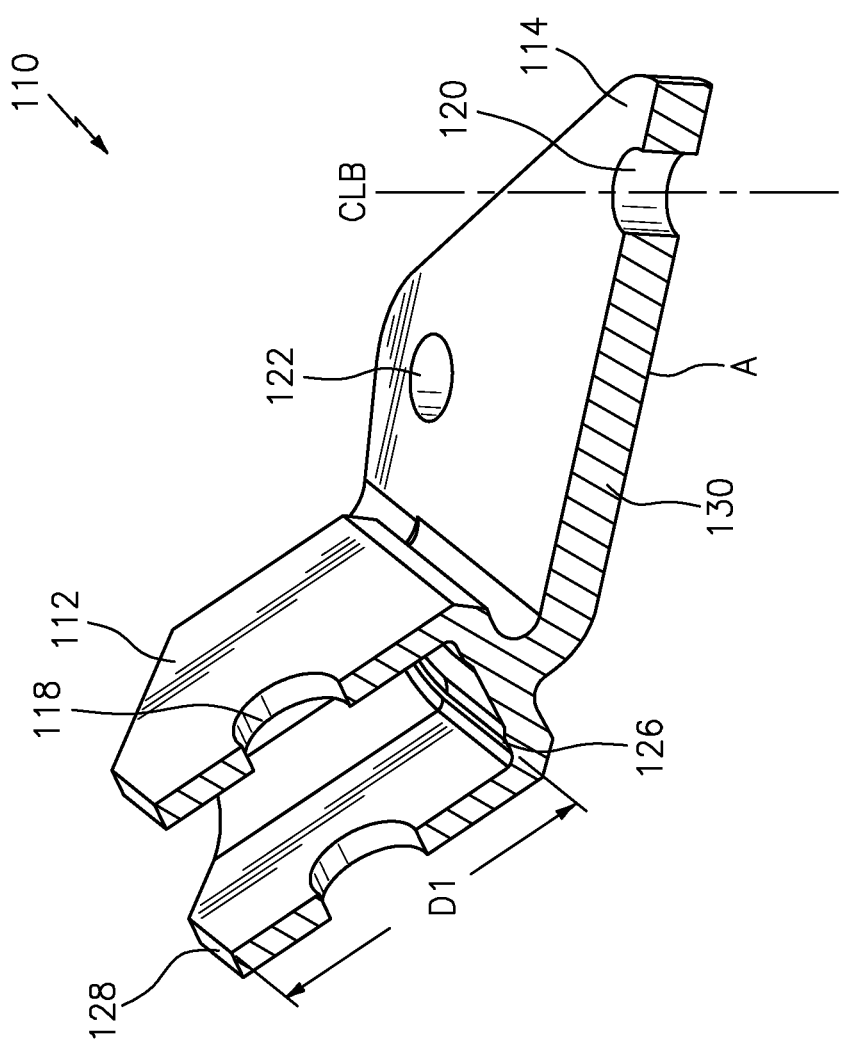
FIG. 3 is a sectional view of the cabin supply bracket of FIG. 1.

FIG. 3 is a sectional view of the cabin supply bracket 110 taken at section line 3-3 of FIG. 2. The view of FIG. 3 depicts a portion of the tie rod coupling hole 118 in the coupling socket 112 and the first and second mounting holes 120 and 122 in the base plate 114. As can be seen in FIG. 3, the coupling socket 112 has depth D1 defined between a lower socket portion 126 and an upper socket portion 128. In an embodiment, the depth D1 of the coupling socket 112 is about 1.106 inches (2.809 cm). A datum A defines a reference on the base plate 114 on a mount-bracket side 130 of the base plate 114 that is aligned to the mount bracket 116 of FIG. 1 when installed in the cabin supply duct assembly 102 of FIG. 1.

Figure 4:
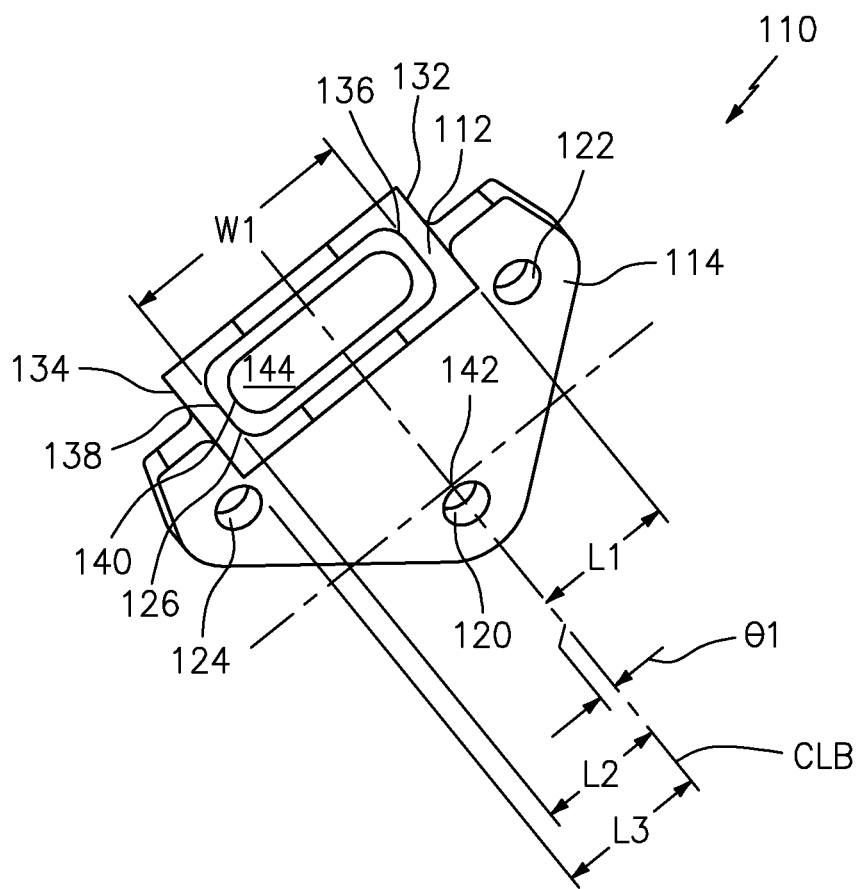
FIG. 4 is another view of the cabin supply bracket of FIG. 1.

FIG. 4 is another view of the cabin supply bracket 110 of FIG. 1. The coupling socket 112 includes a first outer edge 132 proximate the second mounting hole 122 and a second outer edge 134 proximate the third mounting hole 124. A length L1 of about 0.823 inches (2.090 cm) is defined between CLB and the first outer edge 132. A first socket edge 136 is defined in the lower socket portion 126 and proximate the first outer edge 132. A second socket edge 138 is defined in the lower socket portion 126 and proximate the second outer edge 134. A length L2 of about 0.72 inches (1.829 cm) is defined between CLB and the second socket edge 138. A socket width W1 of about 1.40 inches (3.556 cm) is defined between the first and second socket edges 136 and 138. An inner socket edge 140 is defined at a lowest socket portion 144 proximate the lower socket portion 126 and interior to the first and second socket edges 136 and 138. A length L3 of about 0.863 inches (2.192 cm) is defined between CLB and the second outer edge 134. Intersection 142 is defined at the intersection of datum A of FIG. 3 and CLB. The intersection 142 of datum A and CLB is not exactly orthogonal, as a slight offset angle θ1 of about 0.47 degrees is defined relative to perpendicular at the first mounting hole 120 in base plate 114.

Figure 5:
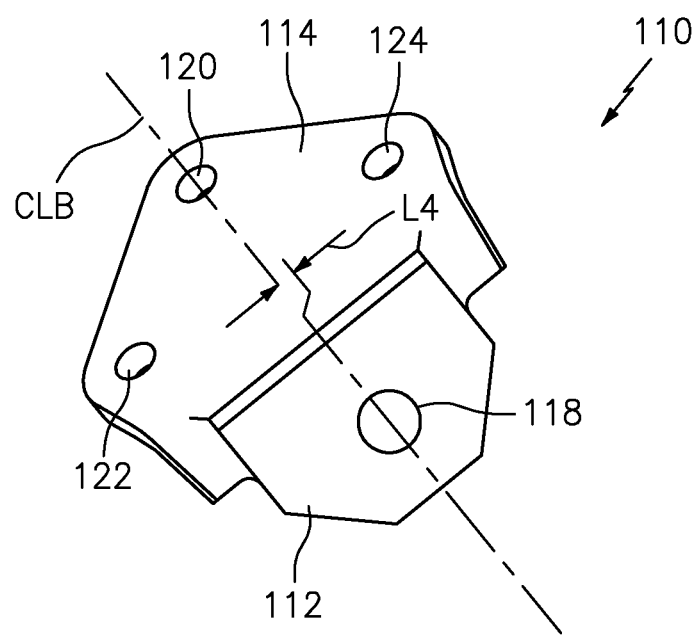
FIG. 5 is another view of the cabin supply bracket of FIG. 1.

FIG. 5 is another view of the cabin supply bracket 110 of FIG. 1. The tie rod coupling hole 118 in the coupling socket 112 and the mounting holes 120-124 in the base plate 114 are depicted in FIG. 5. As can be seen in FIG. 5 an offset length L4 of about 0.020 inches (0.0508 cm) is defined between CLB and the tie rod coupling hole 118 such that the first mounting hole 120 and the tie rod coupling hole 118 are not centrally aligned relative to each other.

Figure 6A:
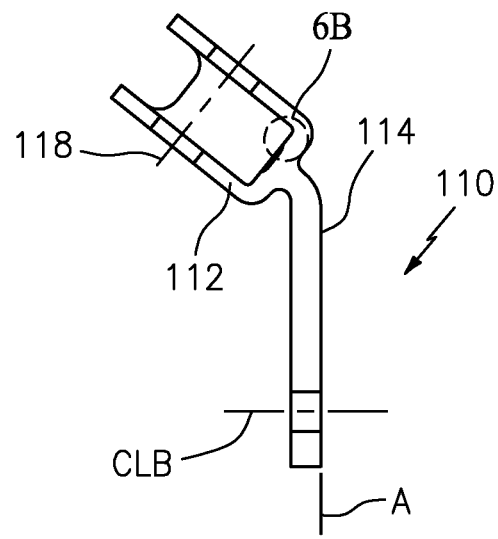
FIG. 6A is another sectional view of the cabin supply bracket of FIG. 1.
Figure 6B:
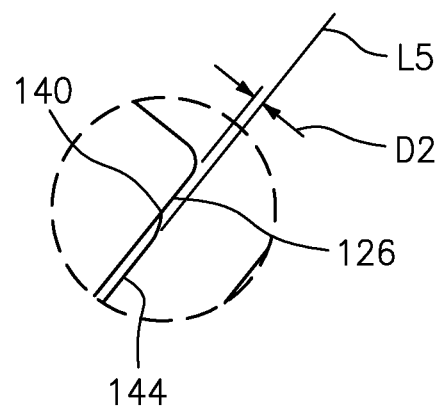
FIG. 6B is a detailed view of a portion of the cabin supply bracket of FIG. 6A.

FIG. 6A is another sectional view of the cabin supply bracket 110 of FIG. 1 taken at section line 3-3 of FIG. 2 as the opposite portion of the cabin supply bracket 110 as depicted in FIG. 3. The coupling socket 112 and tie rod coupling hole 118 are depicted in FIG. 6A along with the base plate 114, CLB, and datum A. A detailed view of part of the lower socket portion 126 is depicted in FIG. 6B. A transition from the lower socket portion 126 to the lowest socket portion 144 at the inner socket edge 140 has a depth D2 of about 0.015 inches (0.0381 cm). The lowest socket portion 144 is offset by a length L5 of about 1.325 inches (3.366 cm) from CLB.

Figure 7:
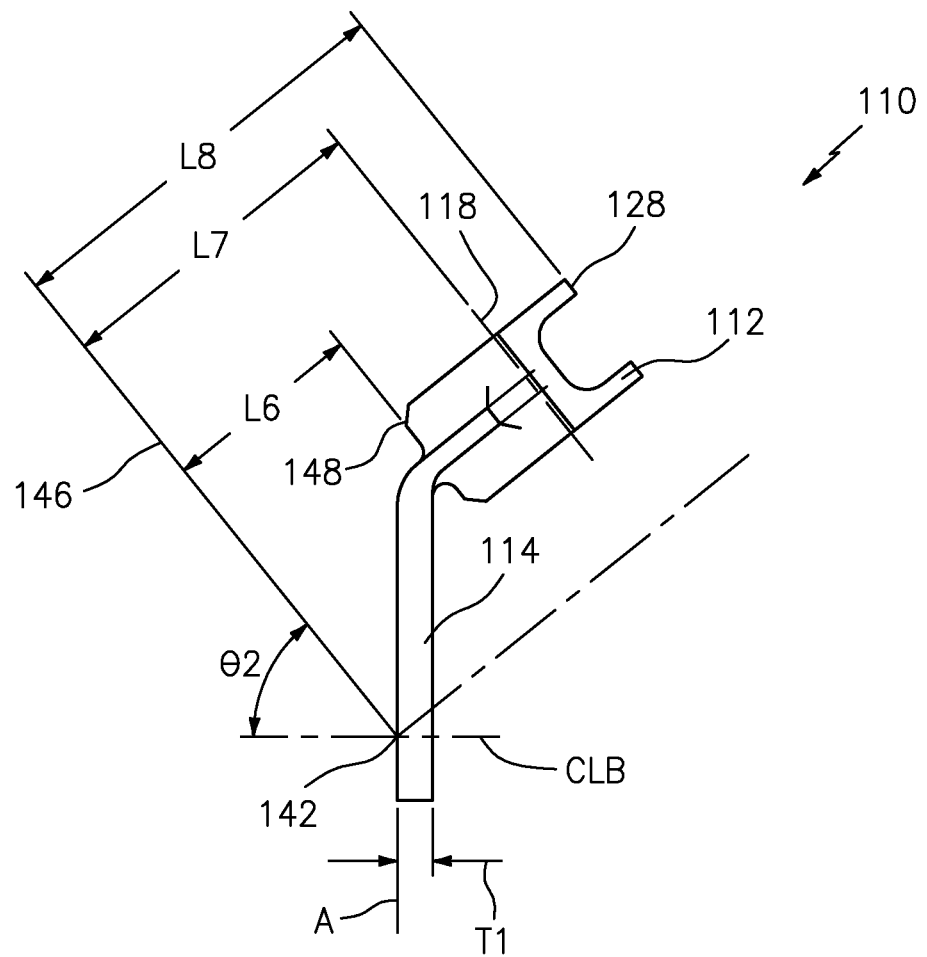
FIG. 7 is another view of the cabin supply bracket of FIG. 1.

FIG. 7 is another view of the cabin supply bracket 110 of FIG. 1. The base plate 114 has a thickness T1 of about 0.20 inches (0.508 cm). A reference line 146 is defined extending from the intersection 142 of datum A and CLB parallel to the upper socket portion 128. The reference line 146 is at an angle θ2 of about 51.23 degrees relative to CLB. A length L6 of about 1.196 inches (3.038 cm) is defined between reference line 146 and a lower face 148 of the coupling socket 112. A length L7 of about 1.92 inches (4.877 cm) is defined between reference line 146 and the tie rod coupling hole 118. A length L8 of about 2.446 inches (6.213 cm) is defined between reference line 146 and the upper socket portion 128.

A number of ratios are defined between elements of the cabin supply bracket 110 as depicted in FIGS. 1-7. In an embodiment, a ratio of the socket width W1 to the thickness T1 of the base plate 114 is between 6.31 and 7.84. A ratio of the socket width W1 to length L2 defined between CLB and the second socket edge 138 is between 1.90 and 1.99. A ratio of the socket width W1 to length L1 defined between CLB and the first outer edge 132 is between 1.66 and 1.74, and a ratio of the socket width W1 to length L3 defined between CLB and the second outer edge 134 is between 1.59 and 1.66. A ratio of the socket width W1 to length L4 defined between CLB and the tie rod coupling hole 118 is between 55.6 and 94. A ratio of the socket width W1 to depth D2 defined between the lower and lowest socket portions 126 and 144 is between 69.5 and 141, and a ratio of the socket width W1 to length L5 defined between the lowest socket portion 144 and CLB is between 1.03 and 1.08. A ratio of the second angle θ2 to the first angle θ1 is between 76.16 and 190.49. A ratio of the socket width W1 to length L6 defined between reference line 146 and the lower face 148 of the coupling socket 112 is between 1.15 and 1.19, a ratio of the socket width W1 to length L7 defined between reference line 146 and the tie rod coupling hole 118 is between 0.72 and 0.74, and a ratio of the socket width W1 to length L8 defined between reference line 146 and the upper socket portion 128 is between 0.56 and 0.58.

A process of installing the cabin supply bracket 110 in the cabin air conditioning and temperature control system 100 is described in reference to FIGS. 1-7. The tie rod 108 is coupled to the cabin supply duct 104 at coupling junction 106. The cabin supply bracket 110 is coupled to the mount bracket 116. The tie rod 108 is coupled to the cabin supply bracket 110. As previously described, the cabin supply bracket 110 includes base plate 114 comprising first, second, and third mounting holes 120-124 distributed in a substantially triangular arrangement, where the first mounting hole 120 has centerline CLB defined therethrough. Coupling socket 112 extends from the base plate 114 and is configured to receive the tie rod 108. The coupling socket 112 includes first and second tie rod coupling supports 117, 119 having tie rod coupling hole 118 formed therethrough. The coupling socket 112 also includes first and second outer edges 132, 134, where the first outer edge 132 is proximate the second mounting hole 122, and the second outer edge 134 is proximate the third mounting hole 134. The coupling socket 112 has a socket width W1 defined between a first socket edge 136 proximate the first outer edge 132 and a second socket edge 138 proximate the second outer edge 134. A ratio of the socket width W1 to thickness T1 of the base plate 114 is between 6.31 and 7.84.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cabin supply bracket for a cabin supply duct assembly, the cabin supply bracket comprising:

a base plate comprising a first, second, and third mounting hole distributed in a substantially triangular arrangement, the first mounting hole having a centerline defined therethrough; and a coupling socket extending from the base plate, the coupling socket comprising a first and second tie rod coupling support having a tie rod coupling hole formed therethrough and a first and second outer edge, the tie rod coupling hold having a centerline defined therethrough, the first outer edge proximate the second mounting hole, the second outer edge proximate the third mounting hole, the coupling socket having a socket width defined between a first socket edge proximate the first outer edge and a second socket edge proximate the second outer edge, wherein a ratio of the socket width to a thickness of the base plate is between 6.31 and 7.84, and a ratio of the socket width to a length defined between the centerline of the first mounting hole and the centerline of the tie rod coupling hole is between 55.6 and 94.

2. The cabin supply bracket of claim 1, wherein a ratio of the socket width to a length defined between the centerline of the first mounting hole and the second socket edge is between 1.90 and 1.99.

3. The cabin supply bracket of claim 1, wherein a ratio of the socket width to a length defined between the centerline of the first mounting hole and the first outer edge is between 1.66 and 1.74, and a ratio of the socket width to a length defined between the centerline of the first mounting hole and the second outer edge is between 1.59 and 1.66.

4. The cabin supply bracket of claim 1, wherein the coupling socket further comprises a lower socket portion and a lowest socket portion, a ratio of the socket width to a depth defined between the lower and lowest socket portions is between 69.5 and 141, and a ratio of the socket width to a length defined between the lowest socket portion and the centerline of the first mounting hole is between 1.03 and 1.08.

5. The cabin supply bracket of claim 1, wherein a datum is defined on a mount-bracket side of the base plate, a first angle is defined relative to perpendicular at an intersection of the datum and the centerline of the first mounting hole, a reference line is defined from the intersection extending parallel to an upper socket portion of the coupling socket and formed at a second angle relative to the centerline of the first mounting hole at the intersection, and a ratio of the second angle to the first angle is between 76.16 and 190.49.

6. The cabin supply bracket of claim 1, wherein a datum is defined on a mount-bracket side of the base plate, a reference line is defined from an intersection of the datum and the centerline of the first mounting hole, the reference line extending parallel to an upper socket portion of the coupling socket, a ratio of the socket width to a length defined between the reference line and a lower face of the coupling socket is between 1.15 and 1.19, a ratio of the socket width to a length defined between the reference line and the tie rod coupling hole is between 0.72 and 0.74, and a ratio of the socket width to a length defined between the reference line and the upper socket portion is between 0.56 and 0.58.

7. A cabin supply duct assembly comprising:
a cabin supply duct;
a tie rod coupled to the cabin supply duct; and
a cabin supply bracket coupled to the tie rod, the cabin supply bracket comprising:
a base plate comprising a first, second, and third mounting hole distributed in a substantially triangular arrangement, the first mounting hole having a centerline defined therethrough; and a coupling socket extending from the base plate, the coupling socket configured to receive the tie rod, the coupling socket comprising a first and second tie rod coupling support having a tie rod coupling hole formed therethrough and a first and second outer edge, the tie rod coupling hold having a centerline defined therethrough, the first outer edge proximate the second mounting hole, the second outer edge proximate the third mounting hole, the coupling socket having a socket width defined between a first socket edge proximate the first outer edge and a second socket edge proximate the second outer edge, wherein a ratio of the socket width to a thickness of the base plate is between 6.31 and 7.84, and a ratio of the socket width to a length defined between the centerline of the first mounting hole and the centerline of the tie rod coupling hole is between 55.6 and 94.

8. The cabin supply duct assembly of claim 7, wherein a ratio of the socket width to a length defined between the centerline of the first mounting hole and the second socket edge is between 1.90 and 1.99.

9. The cabin supply duct assembly of claim 7, wherein a ratio of the socket width to a length defined between the centerline of the first mounting hole and the first outer edge is between 1.66 and 1.74, and a ratio of the socket width to a length defined between the centerline of the first mounting hole and the second outer edge is between 1.59 and 1.66.

10. The cabin supply duct assembly of claim 7, wherein the coupling socket further comprises a lower socket portion and a lowest socket portion, a ratio of the socket width to a depth defined between the lower and lowest socket portions is between 69.5 and 141, and a ratio of the socket width to a length defined between the lowest socket portion and the centerline of the first mounting hole is between 1.03 and 1.08.

11. The cabin supply duct assembly of claim 7, wherein a datum is defined on a mount-bracket side of the base plate, a first angle is defined relative to perpendicular at an intersection of the datum and the centerline of the first mounting hole, a reference line is defined from the intersection extending parallel to an upper socket portion of the coupling socket and formed at a second angle relative to the centerline of the first mounting hole at the intersection, and a ratio of the second angle to the first angle is between 76.16 and 190.49.

12. The cabin supply duct assembly of claim 7, wherein a datum is defined on a mount-bracket side of the base plate, a reference line is defined from an intersection of the datum and the centerline, the reference line extending parallel to an upper socket portion of the coupling socket, a ratio of the socket width to a length defined between the reference line and a lower face of the coupling socket is between 1.15 and 1.19, a ratio of the socket width to a length defined between the reference line and the tie rod coupling hole is between 0.72 and 0.74, and a ratio of the socket width to a length defined between the reference line and the upper socket portion is between 0.56 and 0.58.

13. A method of installing a cabin supply bracket in a cabin air conditioning and temperature control system comprising:
coupling a tie rod to a cabin supply duct;
coupling a cabin supply bracket to a mount bracket; and
coupling the tie rod to the cabin supply bracket, the cabin supply bracket comprising:
a base plate comprising a first, second, and third mounting hole distributed in a substantially triangular arrangement, the first mounting hole having a centerline defined therethrough; and
a coupling socket extending from the base plate, the coupling socket configured to receive the tie rod, the coupling socket comprising a first and second tie rod coupling support having a tie rod coupling hole formed therethrough and a first and second outer edge, the tie rod coupling hold having a centerline defined therethrough, the first outer edge proximate the second mounting hole, the second outer edge proximate the third mounting hole, the coupling socket having a socket width defined between a first socket edge proximate the first outer edge and a second socket edge proximate the second outer edge, wherein a ratio of the socket width to a thickness of the base plate is between 6.31 and 7.84, and a ratio of the socket width to a length defined between the centerline of the first mounting hole and the centerline of the tie rod coupling hole is between 55.6 and 94.

14. The method of claim 13, wherein a ratio of the socket width to a length defined between the centerline of the first mounting hole and the second socket edge is between 1.90 and 1.99.

15. The method of claim 13, wherein a ratio of the socket width to a length defined between the centerline of the first mounting hole and the first outer edge is between 1.66 and 1.74, and a ratio of the socket width to a length defined between the centerline of the first mounting hole and the second outer edge is between 1.59 and 1.66.

16. The method of claim 13, wherein the coupling socket further comprises a lower socket portion and a lowest socket portion, a ratio of the socket width to a depth defined between the lower and lowest socket portions is between 69.5 and 141, and a ratio of the socket width to a length defined between the lowest socket portion and the centerline of the first mounting hole is between 1.03 and 1.08.

17. The method of claim 13, wherein a datum is defined on a mount-bracket side of the base plate, a first angle is defined relative to perpendicular at an intersection of the datum and the centerline of the first mounting hole, a reference line is defined from the intersection extending parallel to an upper socket portion of the coupling socket and formed at a second angle relative to the centerline of the first mounting hole at the intersection, a ratio of the second angle to the first angle is between 76.16 and 190.49, a ratio of the socket width to a length defined between the reference line and a lower face of the coupling socket is between 1.15 and 1.19, a ratio of the socket width to a length defined between the reference line and the tie rod coupling hole is between 0.72 and 0.74, and a ratio of the socket width to a length defined between the reference line and the upper socket portion is between 0.56 and 0.58.

* * * * *